United States Patent [19]

Konkel

[11] Patent Number: 4,923,154

[45] Date of Patent: May 8, 1990

[54] APPARATUS FOR SUPPORTING POINT-OF-SALE TERMINALS

[75] Inventor: Richard D. Konkel, Wilton, Calif.

[73] Assignee: Retail Profits, Inc., Santa Clara, Calif.

[21] Appl. No.: 279,551

[22] Filed: Dec. 1, 1988

[51] Int. Cl.$^5$ ............................................. F16M 13/00
[52] U.S. Cl. ...................................... 248/131; 248/418
[58] Field of Search ............... 248/637, 658, 1 G, 415, 248/664, 676, 447, 458, 131, 146, 149, 152, 418, 174, 176, 310, 349; 108/94, 25, 45

[56] References Cited

U.S. PATENT DOCUMENTS

| | | | |
|---|---|---|---|
| 936,281 | 10/1909 | Woolsey | 248/458 |
| 1,717,456 | 6/1929 | Lasher | 248/174 |
| 1,867,738 | 7/1932 | Fraser | 206/557 |
| 1,983,981 | 12/1934 | Hanson | 248/458 |
| 2,581,879 | 1/1952 | Powers, Jr. | 248/131 |
| 2,880,951 | 4/1959 | Springer | 248/131 |
| 3,931,949 | 1/1976 | Waligorski | 248/418 |
| 4,165,856 | 8/1979 | Wiseheart | 248/415 |
| 4,549,710 | 10/1985 | Prince | 248/349 |

FOREIGN PATENT DOCUMENTS 2232914  1/1975  France ............................. 248/149

Primary Examiner—Ramon O. Ramirez
Assistant Examiner—Robert A. Olson
Attorney, Agent, or Firm—Burns, Doane, Swecker & Mathis

[57] ABSTRACT

A stand for a point-of-sale terminal includes a base for mounting to a counter in a retail establishment, a rotatable tubular member which is mounted to the base for movement between a first and second position, and a box-like holder connected to the rotatable member for holding a point-of-sale terminal in a substantially non-horizontal orientation when the rotatable member is in the first and second positions.

7 Claims, 1 Drawing Sheet

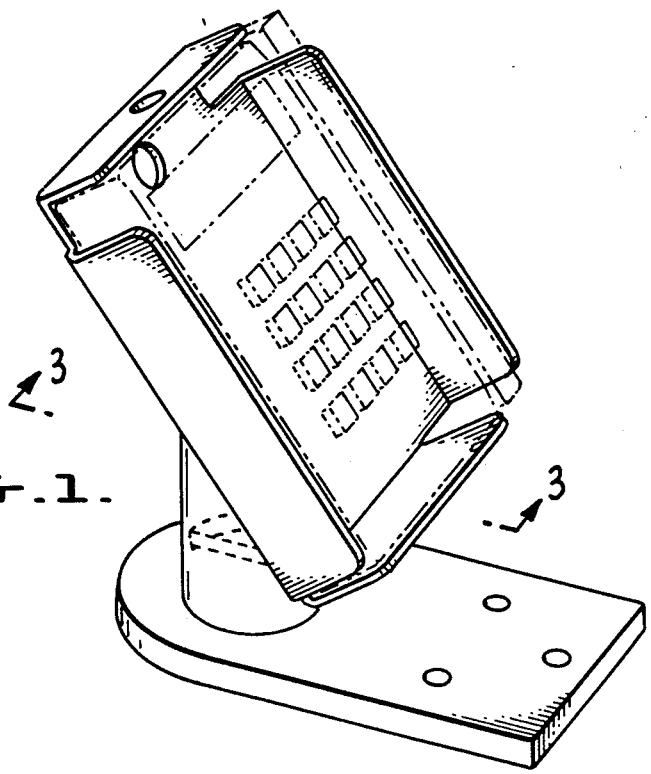
FIG. 1.
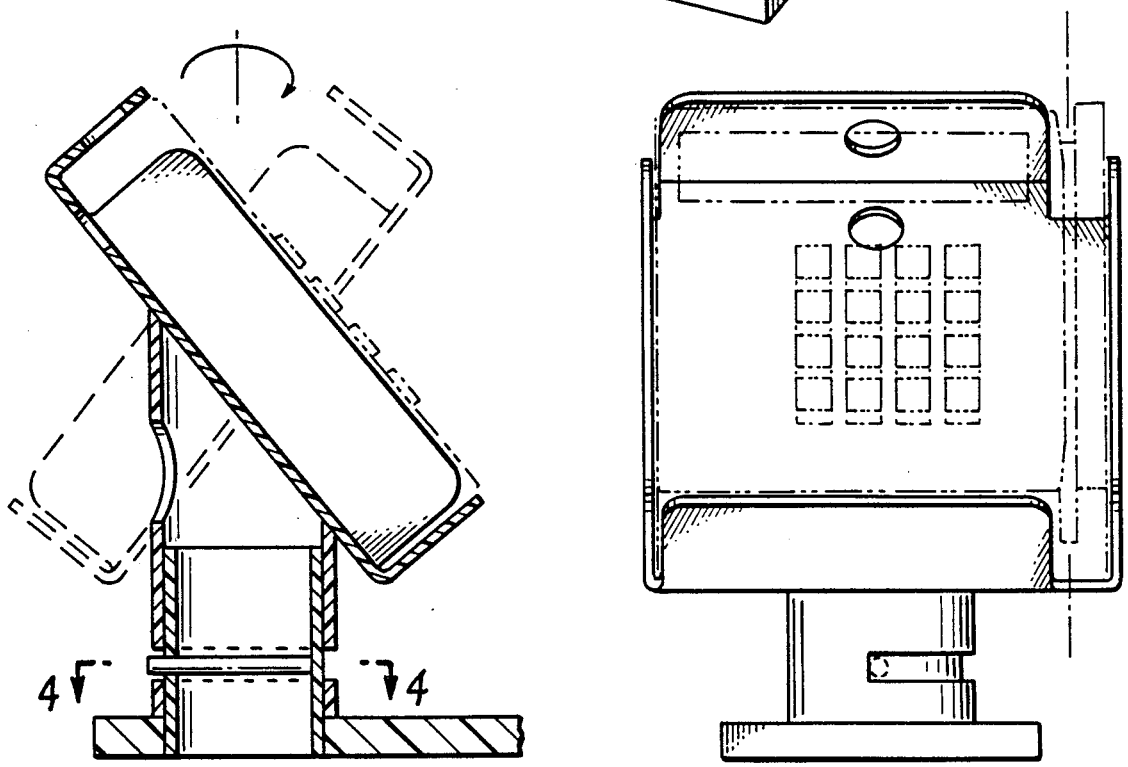
FIG. 3.
FIG. 2.
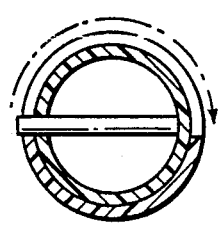
FIG. 4.

APPARATUS FOR SUPPORTING POINT-OF-SALE TERMINALS

BACKGROUND OF THE INVENTION

1. Field of the Invention

The present invention generally relates to devices for supporting computer terminals and, more particularly, to devices for supporting point-of-sale terminals.

2. State of the Art

In processing retail sales transactions, it is known to use point-of-sale terminals to read magnetic card information for check/debit authorization and credit verification purposes. For example, information entered into a point-of-sale terminal may be used for alerting a retail outlet that a credit/debit card is invalid or stolen, or that a customer has reached his credit limit. When a point-of-sale terminal is used for such purposes, the information read into the terminal is electronically transferred to a central data bank which contains authorization information.

In systems which have been recently developed for processing retail sales transactions, it is necessary for information to be entered into a keypad of a point-of-sale terminal by both a retail clerk and by a customer. Such systems include, for example, ones using the TRANSACT point-of-sale terminal available from Retail Profits, Inc. of Santa Clara, Calif. The transactions processed by such systems might include, for example, ones which require a customer's PIN (personal identification number).

SUMMARY OF THE INVENTION

Generally speaking, the present invention provides a base member for mounting to a counter in a retail establishment; a member rotatably mounted relative to the base member for movement between at least a first and second position; and means connected to the rotatable member for holding a point-of-sale terminal in a substantially non-horizontal orientation in the first and second positions.

BRIEF DESCRIPTION OF THE DRAWINGS

In the following drawings, like parts are designated by like reference numerals.

FIG. 1 is a pictorial view of a stand according to the present invention for supporting a point-of-sale terminal.

FIG. 2 is a frontal view of the stand of FIG. 1.

FIG. 3 is side or profile view of the stand of FIG. 1; and

FIG. 4 is a cross-sectional view taken along the plane of line 4—4 in FIG. 3 for viewing in the direction of the arrows.

DETAILED DESCRIPTION OF THE PREFERRED EMBODIMENT

As shown in the drawings, a stand 7 for a point-of-sale terminal generally comprises a base means 11, a member 13 rotatably mounted relative to the base means, and holder means 15 connected to the rotatable member for holding a point-of-sale terminal 19 in a non-horizontal orientation. (In the drawings, the point-of-sale terminal is indicated by phantom lines.)

As typically used, base means 11 is fixed to a counter surface in a retail establishment such that stand 7 can be selectively rotated between two positions. In the first of the two positions, stand 7 presents point-of-sale terminal 19 for use by a retail clerk on one side of the counter; in the second of the two positions, the point-of-sale terminal is presented for use by a customer on the other side of the counter. (In FIG. 3, the first position of the stand is shown by solid lines, and the second position is indicated by dashed lines.) Typically, the first and second positions of stand 7 are angularly displaced from one another by about 180° relative to the counter. The counter can be, for example, the checkout counter at a supermarket.

The base means 11 of stand 7, as shown in FIG. 1, can be a generally flat plate 23 having several apertures 24 formed therein for receiving means, such as screws, which mount the plate to a counter. Typically, base plate 23 is horizontally mounted. In some situations, however, it may be desirable to eliminate base plate 23; in those situations, another portion of stand 7 would serve as the base means.

FIGS. 2 through 4 show one embodiment of a mechanism for connecting rotatable member 13 to base means 11. In the illustrated embodiment, rotatable member 13 is a hollow tube which rotatably mates with a stub shaft 29. The stub shaft 29 is fixed to an aperture 31 formed in base plate 23 such that the stub shaft extends vertically upward to be received by rotatable member 13. It may be noted that, in the illustrated embodiment, the lower end of rotatable member 13 rests on base plate 23 and circumferentially surrounds stub shaft 13. In practice, it is desirable to form stub shaft 29 as a hollow tubular member, because the rotatable member and the stub shaft then combine to form a protective conduit for wires leading to and from point-of-sale terminal 19.

At this juncture, it can be appreciated that stub shaft 29 can be fixed directly into an aperture formed in a counter surface. Such an embodiment is not preferred, however, since it involves substantial modification of a counter surface.

As described to this point, rotatable member 13 is free to completely revolve. In practice, however, such rotation is limited for the purpose of reducing the twisting of wires extending from point-of-sale terminal 19. For limiting rotation of member 13 in the illustrated embodiment, a horizontally-extending slot 33 is formed in the sidewall of member 13 with the ends of the slot displaced from one another by an angular distance of about 180° relative to the axial centerline of member 13. (The full extent of the arcuate slot 33 is best shown in FIG. 4.) A peg 37 is fixed to stub shaft 29 to ride in slot 33 and, thereby, to act as a stop member at the ends of the slot.

In the illustrated embodiment, the holder means 15 is an open box-like structure for receiving point-of-sale terminal 19 such that its keypad faces upwardly and outwardly. The box-like structure can be formed from a generally planar member 39 of rectangular shape whose edges are upturned by about ninety degrees to define two sidewalls 41 and 43 of the box-like structure as well as a top wall 45 and a bottom wall 47. It should be noted that top wall 45 and bottom wall 47 terminate short of one of the sidewalls (e.g., the righthand sidewall 43) to allow space for swiping a magnetic card through a slot in point-of-sale terminal 19.

In practice, it is convenient to form an aperture 53 in the base wall of the box-like structure and an aperture 55 in rotatable member 13 to receive wires from point-of-sale terminal 19.

In operation of the above-described stand 7, point-of-sale terminal 19 is placed in holder 15 and the wires from the terminal are threaded through apertures 53 and 55 and then through tubular members 13 and 29 to a location below the counter on which stand 7 is mounted. Then, with the point-of-sale terminal 19 properly connected, stand 7 can be rotated through an 180° arc to a position where the terminal keypad is conveniently accessible to a clerk on one side of the counter or to a customer on the other side of the counter. During such operation, the mechanism which connects rotatable member 13 to base means 11 prevents the terminal wires from being twisted beyond 180° and prevents terminal 19 from being easily removed from the counter.

Although the present invention has been described above in terms of specific embodiments and modes of operation, the description should therefore be regarded as illustrative rather than limitative. Thus, workers of ordinary skill in the art will appreciate that the invention may be otherwise embodied or practiced, but that such alternative embodiments are encompassed by the terms of the following claims and equivalents thereto.

What is claimed is:

1. A stand for a point-of-sale terminal, comprising:
   a base means for mounting to a counter in a retail establishment;
   a rotatable member which is rotatably mounted relative to the base means for movement between at least a first and second position;
   a stub shaft fixed to the base means for rotatable connection to the rotatable member, the stub shaft and the rotatable member both being circular in cross-section, with one being adapted to be received by the other, and the stub shaft and the rotatable member both being tubular for providing a path through their interiors for wires leading to and from the point-of-sale terminal;
   holder means connected to the rotatable member for holding a point-of-sale terminal in a substantially non-horizontal orientation when the rotatable member is in the first and second positions, the holder means being an open box-like structure for receiving the point-of-sale terminal such that its keypad faces upwardly and outwardly, the upper and lower walls of the box-like structure being formed to terminate short of one of the sidewalls of the box-like structure by a distance sufficient to allow free use of a magnetic card-receiving slot in the point-of-sale terminal.

2. A stand according to claim 1 further including stop means for stopping rotation of the rotatable member at the first and second positions.

3. A stand according to claim 1 wherein the first and second positions are angularly displaced from one another by about 180°.

4. A stand according to claim 1 wherein the stub shaft has a generally circular external cross-section, and the rotatable member is tubular with a circular interior cross-section adapted to receive the stub shaft.

5. A stand according to claim 4 wherein an arcuate slot is formed in the sidewall of the rotatable member, and a stop member is fixed to the stub shaft to ride in the slot.

6. A stand according to claim 7 wherein the opposite ends of the arcuate slot are displaced from one another by an angular distance of about 180° relative to the axial centerline of the stub shaft.

7. A stand according to claim 6 wherein the stop member is a peg which is mounted within an aperture formed in the stub shaft.

* * * * *